UNITED STATES PATENT OFFICE

1,975,054

PRODUCT FOR KILLING OR ELIMINATING FLIES AND PROCESS OF PREPARING IT

Adolf Steindorff and Kaspar Pfaff, Frankfort-on-the-Main, Germany, assignors to Winthrop Chemical Company, Inc., New York, N. Y., a corporation of New York No Drawing. Application September 18, 1931, Serial No. 563,677. In Germany October 1, 1930

10 Claims. (Cl. 167—30)

The present invention relates to products for killing or eliminating flies and to a process of preparing them.

We have found that valuable solutions for killing or eliminating insects are obtained by dissolving a water-soluble ester of a saturated or unsaturated higher fatty acid containing in the alcoholic or phenolic component an external sulfo-group bound to a carbon atom, or a salt thereof having the following general formula $$R_1.COO.R.SO_3Na$$

wherein $R_1$ stands for the saturated or unsaturated alkyl radical of a higher fatty acid and R stands for a benzene or naphthalene nucleus which may be hydrogenated or which may contain sulfo- or alkyl-groups, or for one of the groups

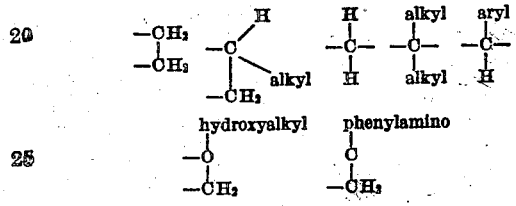

in one of the known organic substances capable of killing or eliminating flies, for instance diphenylether, dibenzyl-ether, dinaphthyl-ether or dicresyl-ether, furthermore substances of the following general formula

wherein R stands for alkyl, aryl or aralkyl, Y stands for H, OH, O-alkyl, O-aryl,

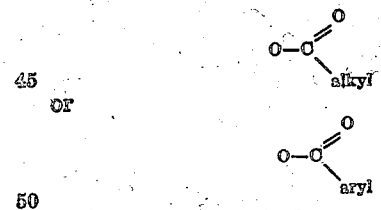

and X stands for hydrogen, halogen alkyl, aryl or O-alkyl.

These solutions can be mixed or emulsified with water in each proportion and can advantageously be utilized for combating insects, particularly flies. Water-soluble esters of saturated or unsaturated higher fatty acids containing in the alcoholic or phenolic component an external sulfo-group bound to a carbon atom can be prepared, for instance, by causing the hydroxylated or halogenated derivatives of the ethane sulfonic acid to react with higher fatty acids so as to form ester-ethane-sulfonic acids. They may also be prepared by causing hydroxylated or halogenated derivatives of aliphatic, cyclo-aliphatic, aromatic or hydroaromatic sulfonic acids to react with the higher fatty acids, the derivatives or salts thereof. Such esters are, for instance, the condensation products of the following compounds:

Sodium hydroxy-ethane-sulfonate with oleic acid chloride,
Isethionic acid with stearic acid chloride,
Chloride of an acid of bleached Montan wax with sodium hydroxy-ethane-sulfonate,
Sodium-1.2-hydroxy-butane-sulfonate with stearic acid chloride,
Potassium - 1.3 - dihydroxypropane - sulfonate with oleic acid chloride,
Sodium ricinoleate with sodium benzylchloride-sulfonate,
Sodium-2-naphthol-6-sulfonate with oleic acid chloride,
Resorcinol-disulfonic acid with oleic acid chloride,
Acetone-bisulfite with oleic acid chloride,
Benzaldehyde-bisulfite with stearic acid chloride,
Cresoxy-$\beta$-hydroxypropane-sulfonate with oleic acid chloride.

Organic substances having the character of an insecticide are, for instance, the ethyl-, amyl-, phenyl-, benzyl-esters and other esters of chlorbenzoic acid, salicylic acid, 5-chloro-2-hydroxyphenyl-1-carboxylic acid, etc., furthermore:

2-methoxy-1-benzoic acid phenyl ester,
2-phenoxy-1-benzoic acid butyl ester,
2-acetone-1-benzoic acid propyl ester,
2-methoxy-5-chlorobenzoic acid amyl ester,
2-chloro-4-methoxy-1-benzoic acid propyl ester,
Benzoate of para-hydroxybenzoic acid ethyl ester,
Ethoxy-cresotinic acid amyl ester,
2.5-dimethoxy-ethoxybenzoic acid amyl ester,
2-methoxy-1-naphthoic acid amyl ester,
2-isoamyl-hydroxy-1-naphthoic acid butyl ester,
2.4-dimethoxybenzoic acid benzyl ester.

The following example serves to illustrate the invention, but it is not intended to limit it thereto:

2.5 parts of sodium oleyl-oxethane-sulfonate are dissolved in 100 parts of 5-cholor-2-hydroxy-benzoic acid amyl ester, if required, while gently heating. A clear solution is obtained which can be mixed with water in any proportion. It is suitable for the most various processes for combating insects.

Instead of 5-chloro-2-hydroxybenzoic acid amyl ester there may also be used, for instance, salicylic acid benzyl ester, diphenylether, ortho-methoxybenzoic acid methylester, etc.

We claim:

1. The process which comprises dissolving a compound of the following formula $$R_1.COO.R.SO_3Na$$

wherein $R_1$ stands for the alkyl radical of a fatty acid and R stands for a benzene or naphthalene nucleus which may be hydrogenated or which may contain sulfo- or alkyl groups or for one of the groups

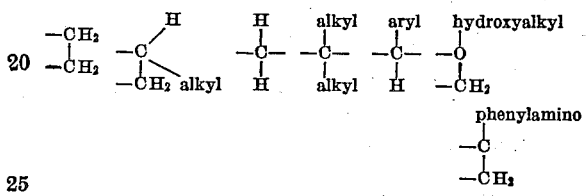

in an organic substance capable of killing or eliminating flies.

2. The process which comprises dissolving a compound of the following formula $$R_1.COO.CH_2.CH_2.SO_3Na$$

wherein $R_1$ stands for an aliphatic radical having more than three carbon atoms, in an organic substance capable of killing or eliminating flies.

3. The process which comprises dissolving a compound of the following formula $$H_{33}C_{17}.COO.CH_2.CH_2.SO_3Na$$

in an organic substance capable of killing or eliminating flies.

4. The process which comprises dissolving a compound of the following formula $$R_1.COO.CH_2.CH_2.SO_3Na,$$

wherein $R_1$ stands for an aliphatic radical having more than three carbon atoms, in a compound of the following formula

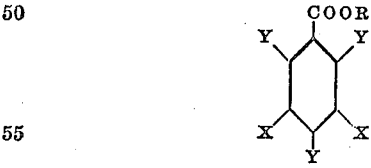

wherein R stands for alkyl, aryl, or aralkyl, Y stands for H, OH, O-alkyl, O-aryl,

or

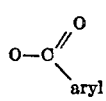

and X stands for hydrogen, halogen, alkyl, aryl, or O-alkyl.

5. The process which comprises dissolving a compound of the following formula $$H_{33}C_{17}.COO.CH_2.CH_2.SO_3Na$$

in a compound of the following formula

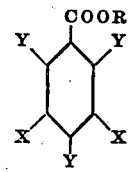

wherein R stands for alkyl, aryl, or aralkyl, Y stands for H, OH, O-alkyl, O-aryl,

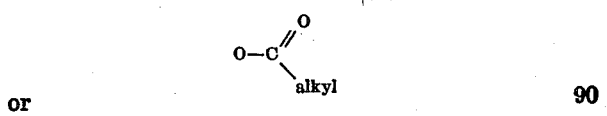

or and X stands for hydrogen, halogen, alkyl, aryl, or O-alkyl.

6. The process which comprises dissolving a compound of the following formula $$R_1.COO.CH_2.CH_2.SO_3Na$$

wherein $R_1$ stands for an aliphatic radical having more than three carbon atoms, in 5-chloro-2-hydroxybenzoic acid amyl ester.

7. The process which comprises dissolving a compound of the following formula $$H_{33}C_{17}.COO.CH_2.CH_2.SO_3Na$$

in 5-chloro-2-hydroxybenzoic acid amyl ester.

8. A composition of matter suitable for killing or eliminating flies, comprising a solution of a compound of the following formula $$R_1.COO.CH_2.CH_2.SO_3Na$$

wherein $R_1$ stands for an aliphatic radical having more than three carbon atoms, in an organic substance capable of killing or eliminating flies.

9. A composition of matter suitable for killing or eliminating flies, comprising a solution of a compound of the following formula $$H_{33}C_{17}.COO.CH_2.CH_2.SO_3Na$$

in a compound of the following formula

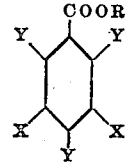

wherein R stands for alkyl, aryl, or aralkyl, Y stands for H, OH, O-alkyl, O-aryl,

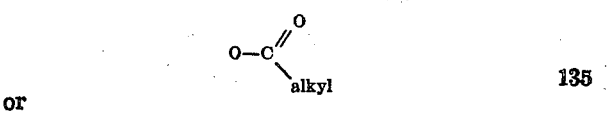

or and X stands for hydrogen, halogen, alkyl, aryl, or O-alkyl.

10. A composition of matter suitable for killing or eliminating flies, comprising a solution of a compound of the following formula $$H_{33}C_{17}.COO.CH_2.CH_2.SO_3Na$$

in 5-chloro-2-hydroxybenzoic acid amyl ester.

ADOLF STEINDORFF.
KASPAR PFAFF.